(12) United States Patent
Guo

(10) Patent No.: US 12,235,563 B2
(45) Date of Patent: Feb. 25, 2025

(54) TUNABLE OPTICAL FILTER DEVICE

(71) Applicant: SHENZHEN HYPERNANO OPTICS TECHNOLOGY CO., LTD, Shenzhen (CN)

(72) Inventor: Bin Guo, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 567 days.

(21) Appl. No.: 17/779,669

(22) PCT Filed: Sep. 25, 2019

(86) PCT No.: PCT/CN2019/107890
§ 371 (c)(1),
(2) Date: May 25, 2022

(87) PCT Pub. No.: WO2021/056273
PCT Pub. Date: Apr. 1, 2021

(65) Prior Publication Data
US 2023/0341743 A1  Oct. 26, 2023

(51) Int. Cl.
*G02F 1/21*  (2006.01)
(52) U.S. Cl.
CPC ........ *G02F 1/213* (2021.01); *G02F 2203/055* (2013.01)
(58) Field of Classification Search
None
See application file for complete search history.

(56) References Cited

U.S. PATENT DOCUMENTS 6,396,632 B1 * 5/2002 Liu .................... G02B 5/20
359/260
2009/0040616 A1  2/2009 Lin et al.

FOREIGN PATENT DOCUMENTS

| CN | 1456923 A | 11/2003 |
| CN | 101806961 A | 8/2010 |
| CN | 101895269 A | 11/2010 |

(Continued)

OTHER PUBLICATIONS

English Translation of International Search Report from PCT/CN2019/107890 dated Jun. 23, 2020 (3 pages).

*Primary Examiner* — Ashok Patel
(74) *Attorney, Agent, or Firm* — Calfee, Halter & Griswold LLP

(57) ABSTRACT

A tunable optical filter device. The device comprises a first substrate (101) provided with a first reflective structure (106) and a thin film (103) provided with a second reflective structure (107), the outer peripheries of the surfaces of the first substrate (101) and the thin film (103) having the reflective structures are mutually bonded by means of bonding compounds (102) so as to form a cavity between the reflective structures, and a piezoelectric thin film structure (108) is provided on a surface of the thin film (103) at the cavity side. The tunable optical filter device can avoid a pull-in effect caused by capacitor driving, thereby improving the movable range of the thin film (103), and correspondingly expanding the tunable range of the spectrum of the Fabry-Perot cavity; in addition, the tunable optical filter device can be applied to a device with a limited size, such as a micro spectrometer, a miniaturized or even a mini-hyperspectral camera or a mobile phone.

15 Claims, 2 Drawing Sheets

(56) References Cited

FOREIGN PATENT DOCUMENTS

| CN | 103413795 | A | | 11/2013 |
|----|-----------|---|---|---------|
| CN | 104737449 | A | | 6/2015 |
| IN | 109786270 | A | | 5/2019 |
| JP | 2005-510756 | | * | 4/2005 |

* cited by examiner

TUNABLE OPTICAL FILTER DEVICE

CROSS REFERENCE TO RELATED APPLICATIONS

This application claims the priority of the patent application PCT/CN2019/107890, filed on Sep. 25, 2019. The contents of this patent application are all hereby incorporated by reference.

TECHNICAL FIELD

The invention relates to the field of semiconductor devices, and in particular to a tunable optical filter device.

BACKGROUND TECHNIQUE

Tunable optical filter devices based on Fabry-Perot interferometer (tunable FPIs) can be used to manufacture miniature spectrometers and small or even miniature hyperspectral cameras. In the field of visible-near infrared (400 nm-2500 nm) hyperspectral imaging, compared to other solutions, Faber Cavity provides the simplest optical path and system structure, which can greatly reduce the volume, cost and power consumption of hyperspectral cameras.

Substrate of FPI devices in the near-infrared and visible-range is usually an optical glass (such as synthetic quartz) substrate, and processed through optical and semiconductor processes to form mirror chips, two of which are then assembled into Faber cavity module by external piezo actuators. By adjusting the driving voltage of the piezoelectric actuator, the relative distance between the two mirror chips can be adjusted to achieve the filtering of light in different wavelengths. It is usually necessary to use very thick glass as such substrate to reduce its deformation. The result is difficulty in mirror chip processing and increase in system volume. Due to the assembly method of the module, it is also difficult to achieve mass production.

Micromachining can form further miniaturized FPI devices, and realize mass production and cost reduction. The main manufacturing methods are surface micromachining and bulk micromachining. The essential feature of the two processes is that the substrate of the mirror itself forms a cantilever structure, or the mirror film itself is the movable elastic support of the device.

The current micro-machined FPI devices are all driven by capacitors. The advantage of the capacitive driving is that the structure is relatively simple, but it is limited by problems such as pull-in, which restricts the displacement of the film to less than ⅓ of the gap.

SUMMARY OF THE INVENTION

In order to solve the above mentioned problems in the existing tunable FPI devices, the present invention provides a tunable optical filter component with compact structure and easy processing and assemble to achieve mass production.

The present invention provides a tunable optical filter device based on FPI. The device comprises a first substrate having a first reflective structure and a thin film having a second reflective structure, surfaces of the first substrate and the thin film on which the reflective structure are located are bonded to each other at the periphery through a bonding compound to form a cavity between the two reflective structures, and the surface of the thin film at the cavity side are provided with a piezoelectric thin film structure. By virtue of the piezoelectric film structure, the thin film having the second reflective structure can be moved to change the gap of the cavity, thereby realizing tunable optical filter function. The tunable optical filter has simple manufacturing process, low cost, small size and convenient batch assemble and production process.

In a preferred embodiment, the thin film is formed on a second substrate, and the second substrate is disposed on the surface of the thin film opposite to that having the second reflective structure, and part of the second substrate corresponding to the second reflective structure is removed. On one hand, the partly removed part creates a path allowing the travel of the light through the FPI, on the other hand, the remaining part forms a supporting structure.

In a preferred embodiment, the material of the second substrate is silicon, and the partly removed part of the second substrate forms an annular weight. By setting the annular weight, the flatness of the first glass film during operation is improved.

In a preferred embodiment, the piezoelectric film structure is disposed on both sides of the cavity. By virtue of the piezoelectric film structure disposed on both sides of the cavity, the film having the reflective structure can be moved relative to the first substrate.

In a preferred embodiment, the way of bonding comprises eutectic bonding, polymer bonding or anodic bonding. By means of bonding, the two glass film structures can be tightly combined to ensure the stability of the tunable optical filter.

In a preferred embodiment, the way of disposing the piezoelectric film structure comprises deposition or bonding.

In a preferred embodiment, the piezoelectric film structure comprises a lead zirconate titanate film, an aluminum nitride film or a zinc oxide film. Films of different materials have corresponding different performance parameters, and the most suitable piezoelectric film material can be selected according to actual application scenarios.

In a preferred embodiment, the first substrate is made by glass, and the thin film is a glass film. It is easy to process and low-cost using glass and glass film.

In a further preferred embodiment, the material of the first reflective structure and the second reflective structure comprises silver. The processing is simpler using silver as the material of the optical mirror.

In a further preferred embodiment, the cavity side of the first substrate is provided with a groove positionally corresponding to the piezoelectric film structure. The groove prevents the piezoelectric film structure from contacting the first substrate when the film is moving.

In a further preferred embodiment, the size of the groove is larger than the size of the piezoelectric film structure. The size of the groove is reasonably set to accommodate the piezoelectric film structure, thereby creating a space for the movement of the film having the reflective structure.

In a preferred embodiment, the material of the first substrate comprises aluminum oxide or silicon, and the material of the thin film comprises silicon or silicon oxide. Material of substrate and film can be selected diversely depending on actual needs.

In a further preferred embodiment, the surface of the first substrate opposite to the first reflective structure is provided with a silicon oxide layer. By virtue of the setting of the silicon oxide layer, the reflected light can be reduced so as to increase the light transmittance of the first substrate.

In a preferred embodiment, the structures of the first reflective structure and the second reflective structure are distributed Bragg reflectors. With the Bragg reflector structure, the light transmittance is increased to a certain extent.

In a further preferred embodiment, the first reflective structure comprises a silicon oxide layer in the middle and a silicon layer disposed on both surfaces of the silicon oxide layer. By virtue of the silicon layers provided on both surfaces of the silicon oxide layer, reflection and refraction of the light are produced when it passing through the silicon oxide and the silicon layer, thereby achieving a filtering effect.

In a preferred embodiment, the second reflective structure comprises silicon oxide layers and silicon layers alternately disposed on the thin film. By virtue of the alternant silicon oxide layers and silicon layers, reflection and refraction of the light are produced when light passing through different silicon oxide and silicon layer, thereby achieving a filtering effect.

The tunable optical filter of the present invention comprises a movable mirror (reflective structure) and a fixed mirror. By disposing the piezoelectric film structure on the movable mirror, the piezoelectric film structure is applied to drive the movement of film mirror relative to the fixed mirror. The movable mirror is the thin film structure, specifically, a glass film or a Bragg reflector structure composed of silicon and silicon oxide. It has the advantages of small size, simple processing technology, and low cost. Micromachining and micro-assembling can be used to form a tunable FPI structure, which can be widely applied to mobile phones, miniature spectrometers and other devices with extremely limited space.

DESCRIPTION OF THE DRAWINGS

The drawings are included to provide a further understanding of the embodiments and the drawings are incorporated into this specification and constitute a part of this specification. The drawings illustrate the embodiments and together with the description serve to explain the principles of the present invention. It will be easy to recognize the other embodiments and the many expected advantages of the embodiments because they become better understood by quoting the following detailed description. The elements of the drawings are not necessarily in proportion to each other. The same reference numerals refer to corresponding similar components.

DESCRIPTION OF EMBODIMENTS

In the following detailed description, reference is made to the accompanying drawings, which form a part of the detailed description and are shown through illustrative specific embodiments in which the present invention can be practiced. In this regard, directional terms such as "top", "bottom", "left", "right", "upper", "lower", etc. are used with reference to the orientation of the described figure. Because the components of an embodiment can be positioned in several different orientations, directional terms are used for illustration purposes and directional terms are by no means limiting. It should be understood that other embodiments may be utilized or logical changes may be made without departing from the scope of the present invention. Therefore, the following detailed description should not be taken in a limiting sense, and the scope of the present invention is defined by the appended claims.

Figure 1:
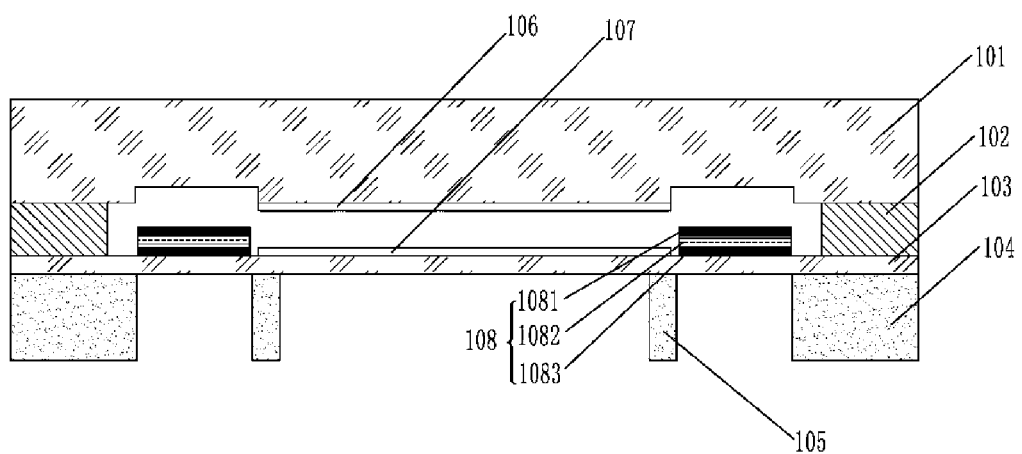
FIG. 1 is a cross-sectional view of a tunable optical filter device according to a first embodiment of the present invention.

FIG. 1 shows a cross-sectional view of a tunable optical filter device according to a first embodiment of the present invention. As shown in FIG. 1, the tunable optical filter device comprises a first substrate 101 and a glass film 103, wherein the glass film 103 is configured as a movable substrate structure, and the first substrate 101 is configured as a fixed substrate structure. The glass film 103 and the surface silicon layer 104 are tightly combined by bonding, and are milled into a composite wafer of specific thickness. The optical mirror 106 and the optical mirror 107 are deposited on the first substrate 101 and the glass film 103 respectively by micromachining, and the surfaces of the first substrate 101 and the glass film 103 on which the reflective structure are located are bonded to each other at the periphery through a bonding compound 102 to form a cavity, both sides of the cavity on the mirror side of the glass film 103 are provided with piezoelectric film structures 108. The piezoelectric film structure 108 drives the movement of glass film 103 so as change the gap of Fabry-Perot cavity, thereby realizing tunable optical filter function. The tunable optical filter has simple manufacturing process, low cost, small size and convenient batch assemble and production process.

In a preferred embodiment, when the first substrate 101 and the glass film 103 are bonded, the optical mirror 106 and the optical mirror 107 are parallel to each other and define a reflection zone in the Fabry-Perot cavity. The optical mirror 105 and the optical mirror 107 are metal mirrors, and the material can be silver or other reflective materials. Specifically, a suitable mirror material can be selected according to the actual needs of hyperspectral imaging to achieve the best filtering effect.

Figure 2:
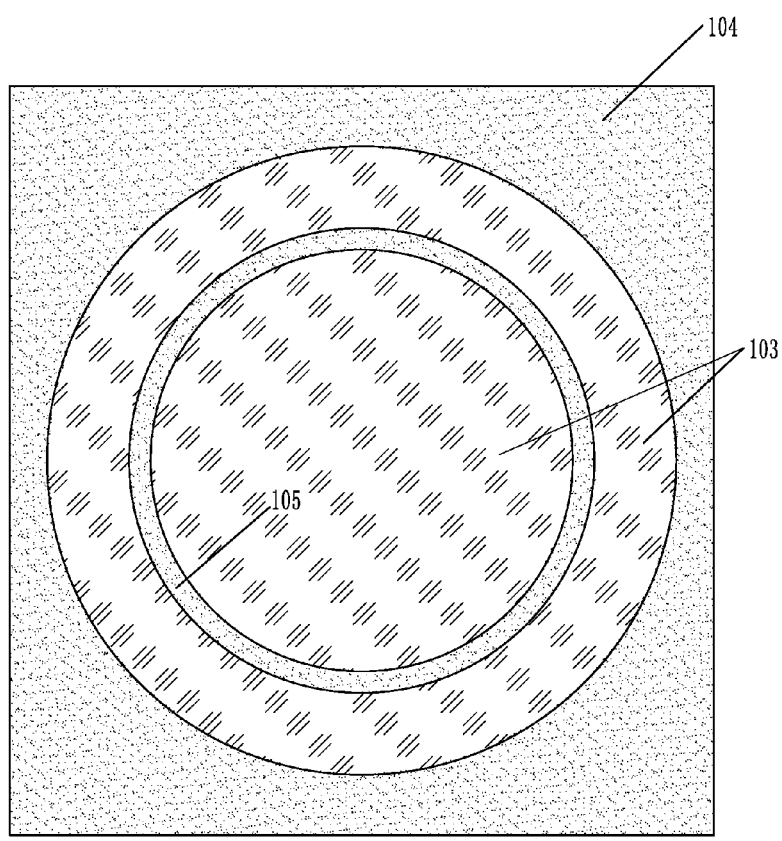
FIG. 2 is a bottom view of the tunable optical filter device according to the first embodiment of the present invention.

Turning now to FIG. 2, FIG. 2 shows a bottom view of the tunable optical filter device according to the first embodiment of the present invention. Combining FIGS. 1 and 2, the surface silicon layer 104 is partly removed to form an annular weight 105 structure and a supporting structure. The surface silicon layer 104 on the glass film 103 is partially removed by plasma etching to form an annular weight 105, which increase the flatness of the glass film 103. It should be recognized that the shape of the annular weight 105 is not limited to a circle, but can also be other shapes such as an ellipse. The etching method is not limited to plasma etching, and it can also be etching with chemical reagents. A suitable etching method to etch the required shape is selected according to the specific use scenario.

In a specific embodiment, the piezoelectric film structure 108 is deposited or bonded on two sides of the mirror 107 on the glass film 103 in the Fabry-Perot cavity. The piezoelectric film structure 108 specifically comprises a piezoelectric film 1082 and electrodes 1081 and 1083 disposed on both surfaces of the piezoelectric film 1082, wherein the material of the piezoelectric film 1082 can be a lead zirconate titanate film, an aluminum nitride film or a zinc oxide film. As a ferroelectric film, lead zirconate titanate film has higher piezoelectric, dielectric and heat release properties than non-ferroelectric films (such as aluminum nitride film or zinc oxide film). It can be used according to specific application scenarios. The piezoelectric film material can be selected such that meets the requirements of various parameters in the application to meet the needs of use under different conditions.

In a preferred embodiment, the first substrate 101 is provided with a groove positionally corresponding to the piezoelectric film structure 108. The size of the groove is larger than that of the piezoelectric film structure 108. Setting a groove prevents the piezoelectric film structure 108 from contacting the first substrate 101 when the glass film 103 is moving. The size of the groove is reasonably set to accommodate the piezoelectric film structure 108, thereby creating a space for the movement of the glass film 103.

In a specific embodiment, the way of bonding between the first substrate 101 and the glass film 103 can be eutectic bonding, polymer bonding or anodic bonding. Eutectic bonding uses metal as the transition layer to achieve the bonding between silicon and silicon. Firm bonding can be achieved even without fine surface or high bonding temperature. Anodic bonding has the advantages of low bonding temperature, good compatibility with other process, high bonding strength and stability. It can be used for bonding between silicon/silicon substrates, non-silicon materials and silicon materials, and mutual bonding between glass, metals, semiconductors, and ceramics. Depending on the actual bonding surface process and material, a suitable bonding method can be selected to realize the bonding between the two glass films.

Figure 3:
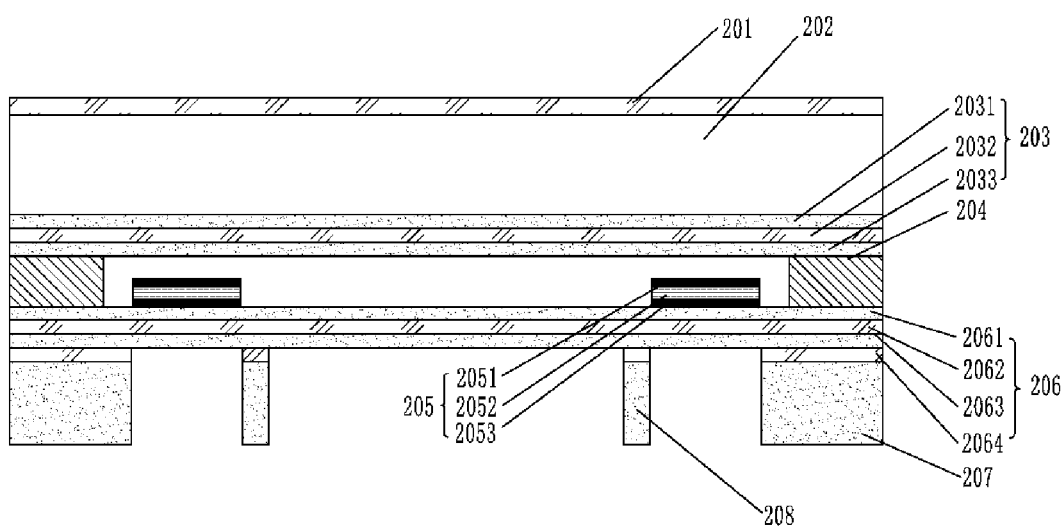
FIG. 3 is a cross-sectional view of a tunable optical filter device according to a second embodiment of the present invention.

FIG. 3 shows a cross-sectional view of a tunable optical filter device according to a second embodiment of the present invention. As shown in FIG. 3, the tunable optical filter device comprises a first substrate 202 and a second substrate 207. A silicon oxide layer 201 is provided on one side of the first substrate 202, a first Bragg reflector 203 is provided on the opposite site of the silicon oxide layer 201, and a second Bragg reflector 206 is provided on one surface of the second substrate 207. The surfaces of the first Bragg reflector 203 and the second Bragg reflector 206 are bonded to each other at the peripheries through a bonding compound 204 to form a Fabry-Perot cavity between the two Bragg reflectors. The gap of Fabry-Perot cavity can be changed with the relative movement of second Bragg reflector 206 and the second substrate 207, thereby realizing tunable optical filter function. The tunable optical filter has simple manufacturing process, low cost, small size and convenient batch assemble and production process.

In a preferred embodiment, the material of the first substrate 202 is sapphire (aluminum oxide) or silicon. Using aluminum oxide or silicon as the substrate ensures the transmission of near infrared light (900-2500 nm or above). It should be realized that other materials other than aluminum oxide or silicon, such as zinc selenide, etc., can also be used to achieve the technical effects of the present invention.

In a preferred embodiment, a silicon oxide layer 201 is provided on a surface of the first substrate 202 by depositing or bonding. The silicon oxide layer 201 can be used as an antireflection film for reducing the reflected light and increasing the transmittance of the light through the surface.

In a preferred embodiment, the first Bragg reflector 203 is disposed on the side of the first substrate 202 opposite to the antireflection film 201, and formed on the first substrate 202 by semiconductor processing of peripheral silicon layer 2031, the silicon oxide layer 2032, and the outer silicon layer 2033. The second Bragg reflector 206 is formed by alternating silicon layers 2061, silicon oxide layers 2062, silicon layers 2063, and silicon oxide layers 2064 on a second substrate 207 by semiconductor processing. The thickness of silicon and silicon oxide is ¼ wavelength. By virtue of the Bragg reflector structure formed by the alternate structure of the silicon layer and the silicon oxide layer, the light is reflected and refracted respectively when passing through the silicon oxide and the silicon layer, thereby realizing a filtering effect.

In a preferred embodiment, when the first Bragg reflector 203 and the second Bragg reflector 206 are bonded to each other through the bonding compound 204, the first Bragg reflector 203 and the second Bragg reflector 206 are parallel to each other and define a reflection zone in the Fabry-Perot cavity. Piezoelectric film structures 205 are disposed by deposition or bonding on both sides of the surface of the second Bragg reflector 206 in the Fabry-Perot cavity, the piezoelectric film structure 205 specifically comprises a piezoelectric film 2052, and electrodes 2051 and 2053 disposed on both surfaces of the piezoelectric film 2052, wherein the film 2052 may be a lead zirconate titanate film, an aluminum nitride film or a zinc oxide film. As a ferroelectric film, lead zirconate titanate film has higher piezoelectric, dielectric and heat release properties than non-ferroelectric films (such as aluminum nitride film or zinc oxide film). It can be used according to specific application scenarios. The piezoelectric film material can be selected such that meets the requirements of various parameters in the application to meet the needs of use under different conditions.

In a preferred embodiment, the second substrate 207 is partially removed by plasma etching to form an annular weight 208 for improving the flatness of the second Bragg reflector 206. It should be recognized that the annular weight 208 is not limited to a circle, but also can be other regular or irregular shapes such as ellipse, rectangle, etc. The way of etching is not limited to plasma etching, and it can also be etching with chemical reagents. Appropriate etching method can be chosen according to the specific use scene and the shape required for the eclipse.

In a specific embodiment, the way of bonding between the first Bragg reflector 203 and the second Bragg reflector 206 can be eutectic bonding, polymer bonding or anodic bonding. Eutectic bonding uses metal as the transition layer to achieve the bonding between silicon and silicon. Firm bonding can be achieved even without fine surface or high bonding temperature. Anodic bonding has the advantages of low bonding temperature, good compatibility with other process, high bonding strength and stability. It can be used for bonding between silicon/silicon substrates, non-silicon materials and silicon materials, and mutual bonding between glass, metals, semiconductors, and ceramics. Depending on the actual bonding surface process and material, a suitable bonding method can be selected to realize the bonding between the two glass films.

The tunable optical filter device of the present invention uses glass film or Bragg reflective structure as a movable film, and bonds it with a fixed mirror made of glass or alumina to form a Fabry-Perot cavity. The piezoelectric film structure on the movable film in the cavity drives the movement of movable film and create a displacement relative to the fixed mirror, thereby realizing the tunable filtering function of the tunable optical filter device. The device is small in size, the device structure can be formed by micromachining and micro-assembling. The production process is simple and easy. The piezoelectric film and the movable mirror are integrated, the mirror displacement in the positive and negative directions can be realized, and the required driving voltage is relatively small compared to capacitor driving. Particularly, when piezoelectric driving, the voltage signal is not directly loaded on the movable film spring structure, which completely avoids the pull-in effect caused by the capacitive driving, thereby increasing the movable range of the film, which means the spectral tunable range of the Farber cavity can be expended accordingly. It can be easily popularized and applied in miniature spectrometers and other small hyperspectral optical equipment.

Obviously, those skilled in the art can make various modifications and changes to the embodiments of the present invention without departing from the spirit and scope of the present invention. In this way, if these modifications and changes are within the scope of the claims of the present invention and their equivalents, the present invention is also intended to cover these modifications and changes. The word "comprising" does not exclude the presence of other elements or steps not listed in a claim. The simple fact that certain measures are recorded in mutually different dependent claims does not indicate that the combination of these measures cannot be used for profit. Any reference signs in the claims should not be considered as limiting the scope.

The invention claimed is:

1. A tunable optical filter device, wherein the device comprises a first substrate having a first reflective structure and a thin film having a second reflective structure, the thin film is formed on a second substrate, and the second substrate is disposed on a surface of the thin film opposite to the second reflective structure, and part of the second substrate positional corresponding to the second reflective structure is partly removed, surfaces of the first substrate and the thin film on which the reflective structure are located are bonded to each other at the periphery through a bonding compound to form a cavity between the reflective structures, and the surface of the thin film at the cavity side are provided with a piezoelectric thin film structure.

2. A tunable optical filter device according to claim 1, wherein material of the second substrate is silicon, and the partly removed part of the second substrate forms an annular weight.

3. A tunable optical filter device according to claim 1, wherein the piezoelectric film structure is disposed on both sides of the cavity.

4. A tunable optical filter device according to claim 1, wherein the way of bonding comprises eutectic bonding, polymer bonding or anodic bonding.

5. The tunable optical filter device according to claim 2, wherein the way of disposing the piezoelectric film structure comprises deposition or bonding.

6. A tunable optical filter device according to claim 1, wherein the piezoelectric film structure comprises a lead zirconate titanate film, an aluminum nitride film or a zinc oxide film.

7. A tunable optical filter device according to claim 1, wherein the first substrate is made by glass, and the thin film is a glass film.

8. A tunable optical filter device according to claim 6, wherein the material of the first reflective structure and the second reflective structure comprises silver.

9. A tunable optical filter device according to claim 6, wherein the cavity side of the first substrate is provided with a groove positionally corresponding to the piezoelectric film structure.

10. A tunable optical filter device according to claim 8, wherein the size of the groove is larger than the size of the piezoelectric film structure.

11. A tunable optical filter device according to claim 1, wherein the material of the first substrate comprises aluminum oxide or silicon, and the material of the thin film comprises silicon or silicon oxide.

12. A tunable optical filter device according to claim 10, wherein the surface of the first substrate opposite to the first reflective structure is provided with a peripheral silicon oxide layer.

13. A tunable optical filter device according to claim 10, wherein the structures of the first reflective structure and the second reflective structure are distributed Bragg reflectors.

14. A tunable optical filter device according to claim 10, wherein the first reflective structure comprises a silicon oxide layer and a peripheral silicon layer disposed on both surfaces of the silicon oxide layer.

15. A tunable optical filter device according to claim 10, wherein the second reflective structure comprises silicon oxide layers and silicon layers alternately disposed on the thin film.

* * * * *